United States Patent
Suwa

(10) Patent No.: US 12,159,068 B2
(45) Date of Patent: Dec. 3, 2024

(54) IMAGE FORMING APPARATUS, METHOD FOR CONTROLLING THE SAME, AND STORAGE MEDIUM TO CHANGE AS NECESSARY A RECEIVED POST-PROCESSING POSITION BASED ON RECEIVED INFORMATION REGARDING THE IMAGE SIZE

(71) Applicant: CANON KABUSHIKI KAISHA, Tokyo (JP)

(72) Inventor: Junichi Suwa, Chiba (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 18/176,351

(22) Filed: Feb. 28, 2023

(65) Prior Publication Data
US 2023/0289109 A1 Sep. 14, 2023

(30) Foreign Application Priority Data

Mar. 9, 2022 (JP) .................................. 2022-035914

(51) Int. Cl.
*G06F 3/12* (2006.01)
(52) U.S. Cl.
CPC ............ *G06F 3/1208* (2013.01); *G06F 3/125* (2013.01)
(58) Field of Classification Search
None
See application file for complete search history.

(56) References Cited

U.S. PATENT DOCUMENTS

| | | | | |
|---|---|---|---|---|
| 7,961,342 B2* | 6/2011 | Morales | ............... | G06F 3/1253 |
| | | | | 358/1.18 |
| 11,347,456 B2* | 5/2022 | Natori | ...................... | B26D 5/00 |
| 2004/0083430 A1* | 4/2004 | Boonen | ................ | G06F 40/151 |
| | | | | 715/230 |
| 2005/0200887 A1* | 9/2005 | Bai | ....................... | G06F 3/1247 |
| | | | | 358/1.15 |
| 2015/0183208 A1* | 7/2015 | Yamawaki | ............ | G06F 3/1208 |
| | | | | 399/407 |
| 2019/0317711 A1* | 10/2019 | Kaneda | ................ | G06F 3/1256 |

FOREIGN PATENT DOCUMENTS

JP 2019185568 A 10/2019

* cited by examiner

*Primary Examiner* — Barbara D Reinier
(74) *Attorney, Agent, or Firm* — Canon U.S.A., Inc. IP Division

(57) ABSTRACT

An image forming apparatus includes a reception unit configured to receive information regarding a size of an image, a setting value regarding N-in-one printing, and a post-processing position from an information processing apparatus, a determination unit configured to determine whether the received setting value regarding the N-in-one printing is a predetermined setting value, a change unit configured to, in a case where the determination unit determines that the received setting value regarding the N-in-one printing is the predetermined setting value, change the received post-processing position based on the received information regarding the size of the image, and an image forming unit configured to form the image received from the information processing apparatus on a recording medium.

16 Claims, 11 Drawing Sheets

| BEFORE CHANGE | AFTER CHANGE | |
|---|---|---|
| | PORTRAIT | LANDSCAPE |
| TOP LEFT | BOTTOM LEFT | TOP RIGHT |
| TOP | LEFT | RIGHT |
| TOP RIGHT | TOP LEFT | BOTTOM RIGHT |
| LEFT | BOTTOM | TOP |
| CENTER | CENTER | CENTER |
| RIGHT | TOP | BOTTOM |
| BOTTOM LEFT | BOTTOM RIGHT | TOP LEFT |
| BOTTOM | RIGHT | LEFT |
| BOTTOM RIGHT | TOP RIGHT | BOTTOM LEFT |

FIG.3
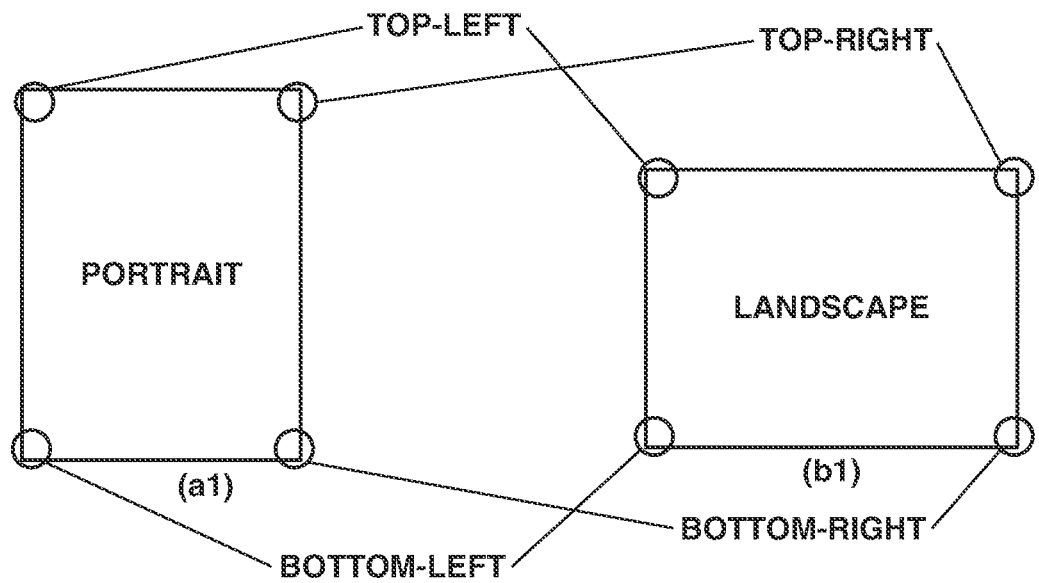
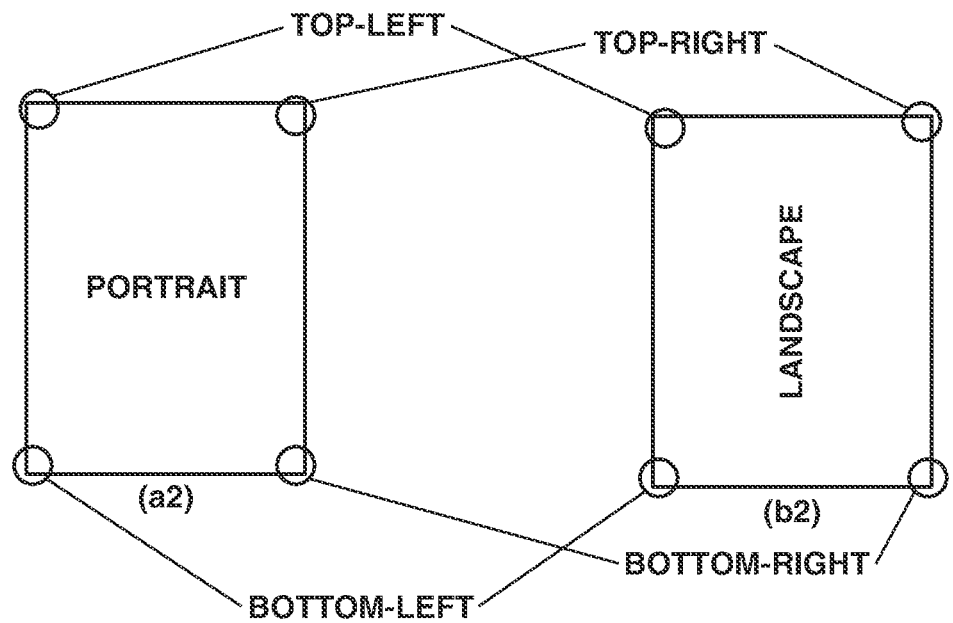

FIG.4
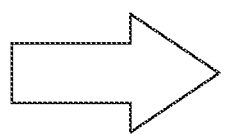
(a1)
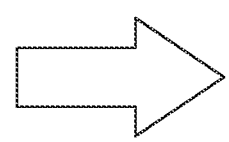
(b1)
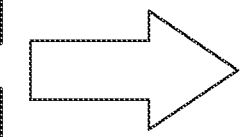
(a2)
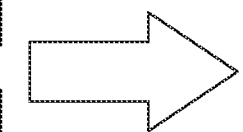
(b2)

FIG.7

```
/*PRESENCE OR ABSENCE OF COLOR PRINTING*/
ColorModeSelect = TRUE;

/*SHEET FEEDING CASSETTE CONFIGURATION INFORMATION*/
InputTryInfo = casset3;

/*DOCUMENT SIZE INFORMATION REGARDING SHEET FEEDING CASSETTE*/
Casset1SizeInfo = A4;
Casset1SizeInfo = A4;
Casset1SizeInfo = A3;

/*SUPPORT OF NUP PRINTING (SUPPORTED NUP)*/
suportLayoutInfo = suport9;  ~702

/*PRESENCE OR ABSENCE OF POST-PROCESSING*/
FinishingInfo = TRUE;  ~703

/*TYPE OF POST-PROCESSING (STAPLING/PUNCHING)*/
FinishingSuportStaple = TRUE;  } 704
FinishingSuportPunch = TRUE;

/*POST-PROCESSING POSITIONS*/
FinishingSuportLocation_topleft = TRUE
FinishingSuportLocation_top = TRUE
FinishingSuportLocation_topright = TRUE
FinishingSuportLocation_left = TRUE
FinishingSuportLocation_center = TRUE    } 705
FinishingSuportLocation_right = TRUE
FinishingSuportLocation_bottomleft =
TRUE
FinishingSuportLocation_bottom = TRUE
FinishingSuportLocation_bottomright =
TRUE
```

ABILITY INFORMATION 701

```
/*SIZE*/
PDFinfo_Size = A4;

/*WIDTH*/
PDFinfo_Width =297;

/*HEIGHT*/
PDFinfo_Height =210;

/*COLOR OR MONOCHROME*/
PDFinfo_Colormode = color;

/*NUMBER OF PAGES*/
PDFinfo_MediaCount = 4;
```

PDF INFORMATION 710

```
/*SIZE*/
PT_SizeInfo = A4;

/*PRINTING ORIENTATION*/
PT_Orientation = Portrait;

/*COLOR OR MONOCHROME*/
PT_Colormode = color;

/*NUMBER OF PAGES*/
PT_MediaCount = 4;

/*NUP*/
PT_Layout = 2;  ~721

/*NUMBER OF COPIES*/
PT_copies = 1;

/*DUPLEX/SIMPLEX*/
PT_Plex = duplex;

/*STAPLING POSITION*/
PT_StapleLocation = bottom_left
                            ~722
```

PRINT TICKET INFORMATION 720

FIG.10

| BEFORE CHANGE | AFTER CHANGE ||
| --- | --- | --- |
| | PORTRAIT | LANDSCAPE |
| TOP LEFT | BOTTOM LEFT | TOP RIGHT |
| TOP | LEFT | RIGHT |
| TOP RIGHT | TOP LEFT | BOTTOM RIGHT |
| LEFT | BOTTOM | TOP |
| CENTER | CENTER | CENTER |
| RIGHT | TOP | BOTTOM |
| BOTTOM LEFT | BOTTOM RIGHT | TOP LEFT |
| BOTTOM | RIGHT | LEFT |
| BOTTOM RIGHT | TOP RIGHT | BOTTOM LEFT |

IMAGE FORMING APPARATUS, METHOD FOR CONTROLLING THE SAME, AND STORAGE MEDIUM TO CHANGE AS NECESSARY A RECEIVED POST-PROCESSING POSITION BASED ON RECEIVED INFORMATION REGARDING THE IMAGE SIZE

BACKGROUND

Field

The present disclosure relates to an image forming apparatus, a method for controlling the image forming apparatus, and a storage medium.

Description of the Related Art

It is known that an information processing apparatus can generate print data without using a printer driver (or a print application) designed by a printer's vendor. In a case where the printer driver manufactured by the vendor is not used, a print function provided by an operating system of the information processing apparatus can be used. In this case, general-purpose software for the print function or general-purpose software provided by a vendor that provides a cloud print service and having the function of generating print data can be used. Print data generated by the general-purpose software can be printed by any image forming apparatus that supports the general-purpose software, regardless of the model or the vendor.

The print data generated using the general-purpose software is transmitted to the image forming apparatus according to a predetermined protocol such as the Internet Printing Protocol (IPP). The image forming apparatus interprets the received print data and forms an image.

When the print data is generated using the general-purpose software, it is possible to set post-processing such as binding a print product or punching holes in a print product, as discussed in Japanese Patent Application Laid-Open No. 2019-185568. The image forming apparatus executes the post-processing based on the type and position of the post-processing set in the received print data.

Using the general-purpose software, it is also possible to set N-in-one printing for a plurality of images. The N-in-one printing is the function of laying out and printing a plurality of pages on one side of a sheet. With the N-in-one printing set, an instruction to execute the post-processing on the output can be provided.

For example, suppose that a user wishes to print portrait-oriented images on sheets by enabling the setting to print two pages on one side of each sheet, and then bind the sheets by stapling. At this time, the user expects the top left of the image on the first page to be stapled and specifies "top left" as a stapling position. Such a state is illustrated on the right side of an example (b1) in FIG. 4.

If, however, the portrait-oriented images are printed with the two-in-one printing enabled, the first page is rotated by 90 degrees and placed on the lower side of a sheet as illustrated on the right side of an example (a1) in FIG. 4. Thus, if the top left of the sheets is stapled, the sheets are bound at a position different from the top left of the first page intended by the user.

When the N-in-one printing and the post-processing are set in such a manner, the position specified by the user and the position where the sheets are actually bound may differ from each other.

SUMMARY

According to various embodiments of the present disclosure, an image forming apparatus includes a reception unit configured to receive information regarding a size of an image, a setting value regarding N-in-one printing, and a post-processing position from an information processing apparatus, a determination unit configured to determine whether the received setting value regarding the N-in-one printing is a predetermined setting value, a change unit configured to, in a case where the determination unit determines that the received setting value regarding the N-in-one printing is the predetermined setting value, change the received post-processing position based on the received information regarding the size of the image, and an image forming unit configured to form the image received from the information processing apparatus on a recording medium.

Further features of the present disclosure will become apparent from the following description of example embodiments with reference to the attached drawings.

BRIEF DESCRIPTION OF THE DRAWINGS

FIG. 3 is a schematic diagram illustrating a post-processing position according to the example embodiment.

FIG. 4 is a schematic diagram illustrating examples of an output in a case where N-in-one printing and post-processing are both executed according to the example embodiment.

FIG. 7 is a diagram illustrating examples of ability information, Portable Document Format (PDF) information, and print ticket information according to the example embodiment.

FIG. 10 is a diagram illustrating an example of a table used in the post-processing position change processing according to the example embodiment.

DESCRIPTION OF THE EMBODIMENTS

Example embodiments of the present disclosure will be described below with reference to the drawings.

Figure 1:
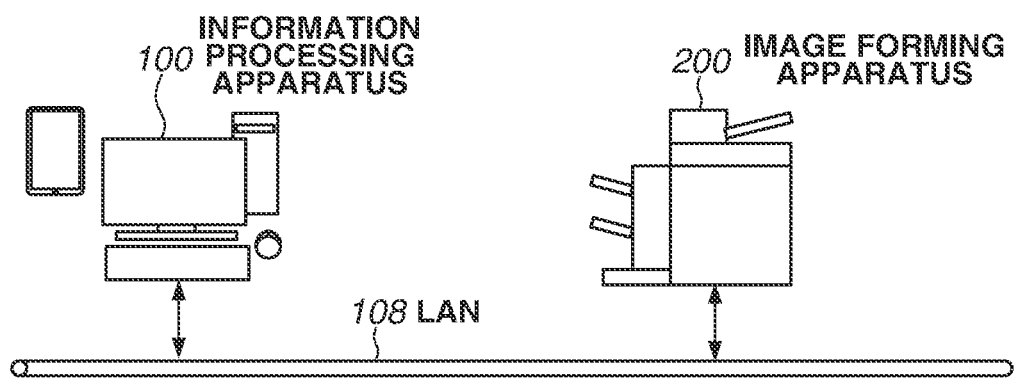
FIG. 1 is a diagram illustrating an example of a configuration of a system according to an example embodiment of the present disclosure.

A configuration of a system according to an example embodiment of the present disclosure will be described with reference to FIG. 1. This system has a configuration in which an information processing apparatus 100 serving as a host computer and an image forming apparatus 200 are connected to each other via a local area network (LAN) 108.

The information processing apparatus 100 is a mobile apparatus typified by a tablet terminal or a smartphone, or a personal computer (PC). Predetermined software that provides a predetermined print function compliant with the Internet Printing Protocol (IPP) is installed or preinstalled on the information processing apparatus 100. The image forming apparatus 200 receives a print job generated by the predetermined software installed on the information processing apparatus 100, forms an image, and executes printing processing.

Figure 2:
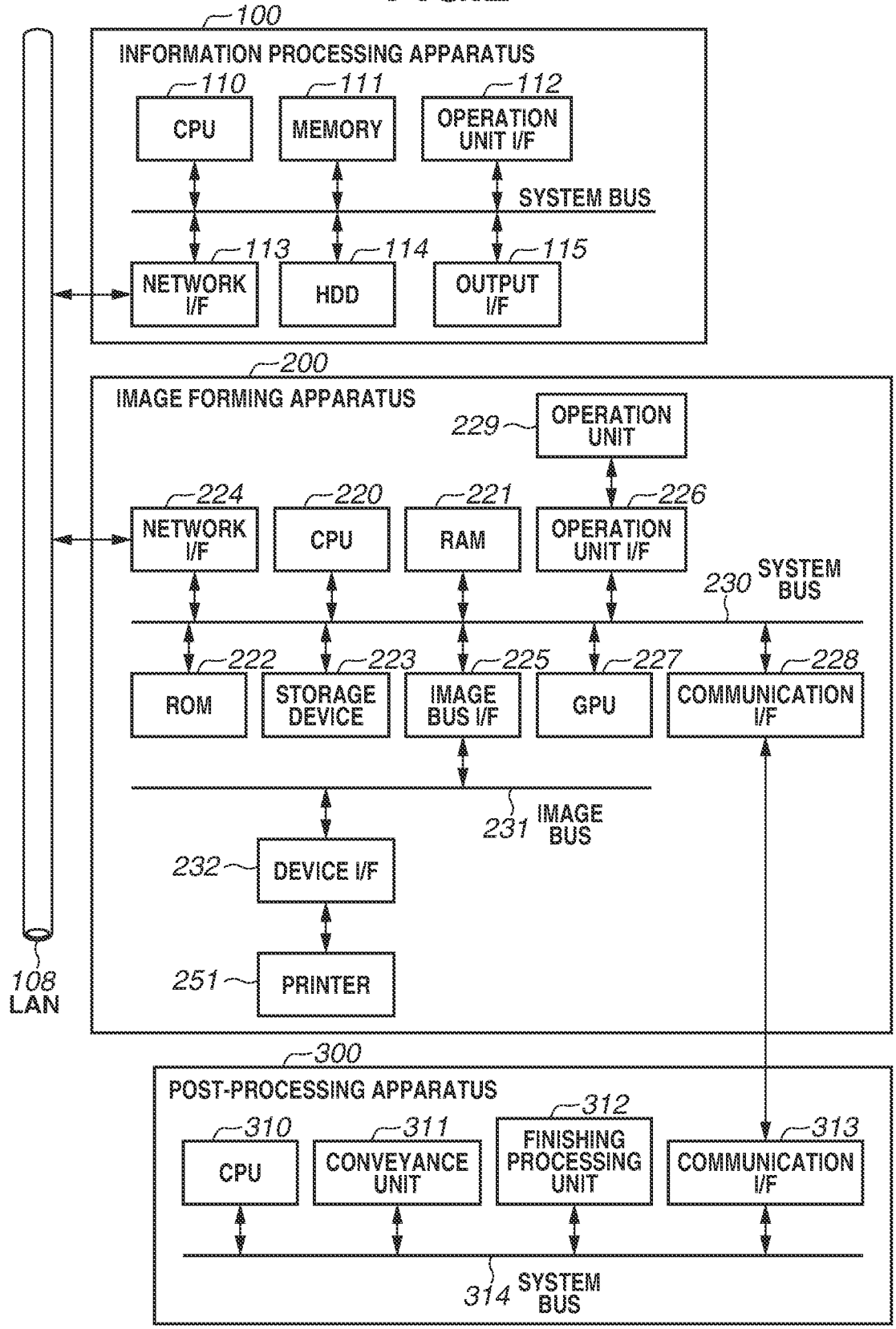
FIG. 2 is a block diagram illustrating examples of hardware configurations according to the example embodiment.

FIG. 2 illustrates examples of hardware configurations of the information processing apparatus 100, the image forming apparatus 200, and a post-processing apparatus 300 according to the present example embodiment.

The information processing apparatus 100 includes a central processing unit (CPU) 110 that controls the entire information processing apparatus 100. The CPU 110 reads control programs stored in a memory 111 or a hard disk drive (HDD) 114 and performs various types of control such as print control. An operation unit (not illustrated) for operating the information processing apparatus 100 connects to the information processing apparatus 100 via an operation unit interface (I/F) 112. For example, the information processing apparatus 100 connects to the operation unit including a liquid crystal display device having a touch panel function and various hardware keys, and the operation unit functions as a reception unit that receives an instruction from a user. The information processing apparatus 100 connects to the LAN 108 via a network I/F 113 and transmits information for use in printing to the image forming apparatus 200. The information processing apparatus 100 also includes an output I/F 115 to output information from the information processing apparatus 100, and is connected to a display unit such as a display via the output I/F 115.

The information processing apparatus 100 generates a page description language (PDL) indicating page information regarding a page to be printed and transmits the PDL to the image forming apparatus 200. Based on the received PDL, the image forming apparatus 200 executes printing processing.

The image forming apparatus 200 includes a printer 251. The printer 251 is connected to an image bus 231 via a device I/F 232. The printer 251 outputs image data generated by the image forming apparatus 200 to a recording medium such as paper. A CPU 220 controls the entire image forming apparatus 200. A random-access memory (RAM) 221 is a system work memory for the operation of the CPU 220. The RAM 221 is also a memory that temporarily stores the transmitted PDL, intermediate data generated in the image forming apparatus 200 for printing processing, and input image data, and is also a work area used to execute rendering processing. A read-only memory (ROM) 222 is a boot ROM and stores a boot program for the system. A storage device 223 is a hard disk drive and stores system software for various types of processing and the transmitted PDL.

A graphics processing unit (GPU) 227 is a graphics processing unit that executes overall image forming processing and image correction processing executed by the image forming apparatus 200. While FIG. 2 illustrates the CPU 220 and the GPU 227 as separate components in the present example embodiment, a configuration may be employed in which the GPU 227 is a part of the CPU 220.

An operation unit I/F 226 is an interface unit with an operation unit 229 including a display screen capable of displaying various menus and print data information, and outputs operation screen data to the operation unit 229. The operation unit I/F 226 also functions to transmit information input via the operation unit 229 by an operator to the CPU 220. A network I/F 224 connects to the LAN 108 and inputs and outputs information from and to an external apparatus such as the information processing apparatus 100. A communication I/F 228 is connected to the post-processing apparatus 300 and performs control regarding post-processing on sheets on which printing is executed by the image forming apparatus 200.

The above-described units are placed on a system bus 230. An image bus I/F 225 is an interface for connecting the system bus 230 and the image bus 231 that transfers image data at high speed. The image bus I/F 225 is a bus bridge that converts a data structure. The device I/F 232 is connected to the image bus 231.

The post-processing apparatus 300 includes a CPU 310 that controls the entire post-processing apparatus 300. The post-processing apparatus 300 causes a conveyance unit 311 to convey sheets on which printing is performed by the image forming apparatus 200, and causes a finishing processing unit 312 to execute post-processing on the sheets.

For example, the post-processing apparatus 300 executes post-processing such as aligning a plurality of sheets, punching holes in a plurality of sheets, or binding (stapling) a plurality of sheets. The post-processing apparatus 300 connects to the image forming apparatus 200 via a communication I/F 313 and exchanges post-processing data with the image forming apparatus 200. The above-described units are placed on a system bus 314.

FIG. 3 illustrates the relationships between reference positions for a finishing position.

In a case where the user specifies a finishing position on a print settings screen operated by the user, image reference positions based on the orientation of an image are sometimes used. The image reference positions are reference positions based on the orientation of an image regardless of the orientation of a sheet, as illustrated in examples (a1) and (b1) of FIG. 3.

On the other hand, in a print job, the finishing position is sometimes specified based on sheet reference positions for specifying the finishing position based on a sheet placed in a portrait orientation.

In the case of using the sheet reference positions, a reference orientation is the orientation of a sheet where the shorter sides of the sheet are at the top and bottom, and the longer sides of the sheet are at the left and right. Thus, if an image is portrait-oriented like an example (a2) of FIG. 3, the finishing position specified based on the image reference positions and the finishing position specified based on the sheet reference positions are the same as each other. If, on the other hand, an image is landscape-oriented, the image is rotated by 90 degrees to the left and placed in the portrait orientation like an example (b2) of FIG. 3. Thus, the finishing position specified based on the image reference positions is to be converted.

For example, suppose that "top left" is specified as the finishing position based on the image reference positions. The predetermined software that provides the print function of the information processing apparatus 100 generates a print job in which "bottom left" is specified as the finishing position. Based on the sheet reference positions, the image forming apparatus 200 is to interpret the position for finishing processing specified in print data generated using the predetermined software. The present example embodiment is directed to addressing an issue that arises due to the above-described difference between the reference positions used to specify the finishing position when print settings are made and the reference positions used to specify the finishing position when the predetermined software writes the finishing position in print ticket information.

Next, a case where the issue arises will be described with reference to FIG. 4 in the present example embodiment.

FIG. 4 illustrates the example (a1) where N-in-one printing (two-in-one printing) is executed so that two of four portrait-oriented images are laid out and printed on one sheet, and then stapling processing is executed to bind the sheets. Suppose here that the user makes the settings with the intention to produce an output like the example (b1) of FIG. 4.

At this time, the image forming apparatus 200 receives a print job in which the four portrait-oriented images, an instruction to perform the two-in-one printing, and an instruction to perform top-left stapling are described. If, however, the image forming apparatus 200 lays out the four portrait-oriented images in a two-in-one manner and performs the top-left stapling, this results in an output like the example (a1) of FIG. 4. Thus, the output is different from that originally intended by the user.

Next, a case where images to be printed are landscape-oriented will be described with reference to examples (a2) and (b2) of FIG. 4. The examples (a2) and (b2) in FIG. 4 illustrate processing in which N-in-one printing (two-in-one printing) is performed so that two of four landscape-oriented images are laid out and printed on one sheet and then top-left stapling is executed to bind the sheets. Suppose here that the user makes the settings with the intention to produce an output like the example (b2) of FIG. 4.

At this time, the image forming apparatus 200 receives a print job in which the four landscape-oriented images, an instruction to perform the two-in-one printing, and an instruction to staple bottom-left stapling are described. The reason why the stapling position changes from "top left" to "bottom left" is that the orientation of the images is the landscape orientation. This results in an output like the example (a2) of FIG. 4. Thus, the output is different from that originally intended by the user.

The present example embodiment is directed to addressing the issue where, as described above, if the finishing processing and the N-in-one printing are both set, the finishing processing may sometimes be executed at a position different from that intended by the user when the settings are made.

Next, processing by the information processing apparatus 100 and the image forming apparatus 200 according to the present example embodiment will be described with reference to FIG. 5.

Figure 5:
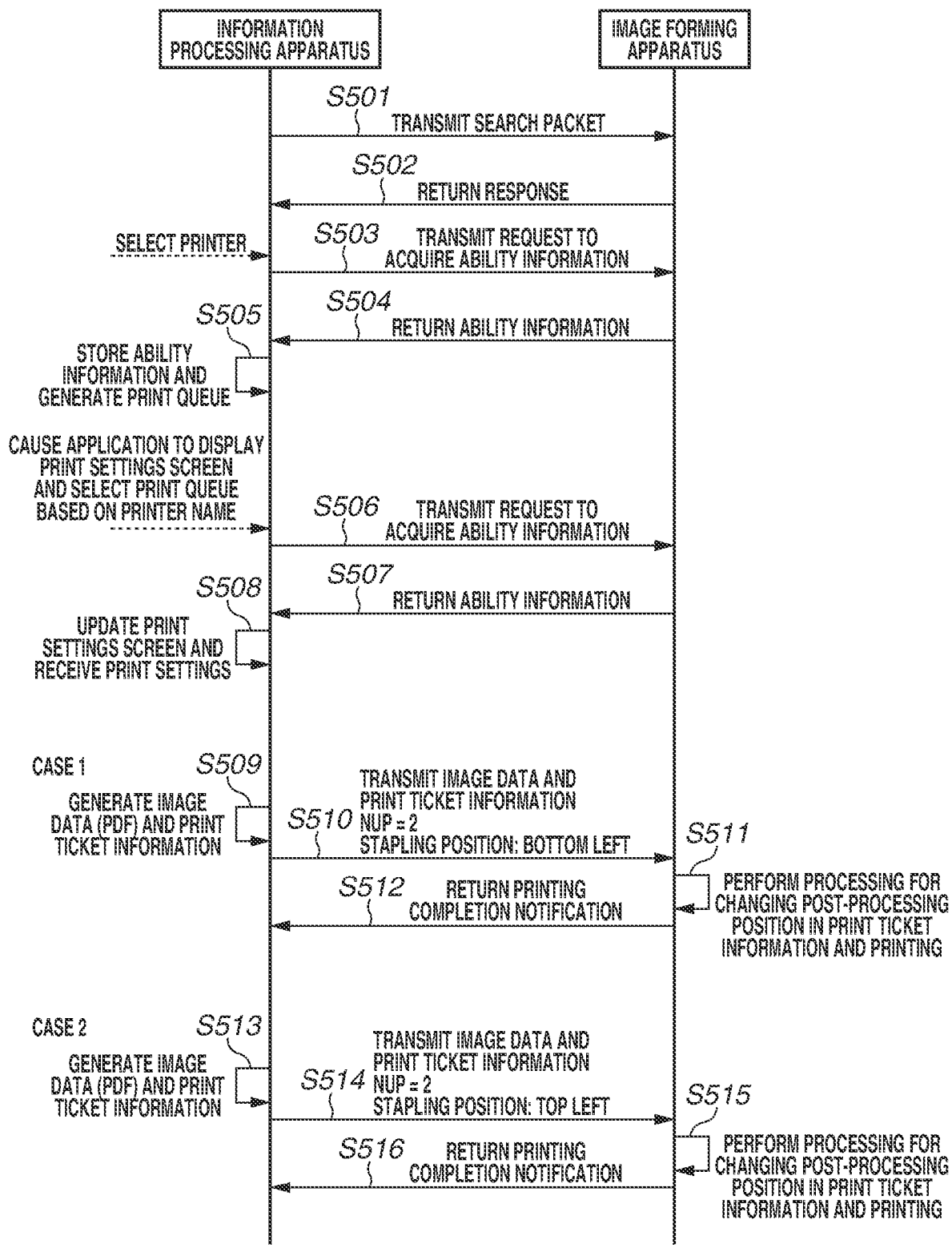
FIG. 5 is a diagram illustrating an example of processing between an information processing apparatus and an image forming apparatus according to the example embodiment.

FIG. 5 illustrates an example of a sequence of printing processing including image forming processing by the information processing apparatus 100 and the image forming apparatus 200 according to the present example embodiment.

In step S501, the information processing apparatus 100 transmits a search packet to search for the image forming apparatus 200. This search corresponds to an image forming apparatus search function provided by an operating system (OS) of the information processing apparatus 100 and is a search according to a predetermined protocol such as multicast Domain Name Service (mDNS) or Bonjour.

In step S502, upon receiving the search packet from the information processing apparatus 100, the image forming apparatus 200 returns a response to the information processing apparatus 100. The information processing apparatus 100 displays a list of pieces of information regarding image forming apparatuses having responded, and receives the selection of a desired printer to be used from the user.

If the user selects which printer to use for output, then in step S503, the information processing apparatus 100 makes an inquiry of the image forming apparatus 200 about the ability of the image forming apparatus 200. In step S504, upon receiving the inquiry, the image forming apparatus 200 returns ability information regarding the image forming apparatus 200 to the information processing apparatus 100. FIG. 7 illustrates ability information 701 as an example of the ability information transmitted from the image forming apparatus 200 to the information processing apparatus 100.

Figure 11:
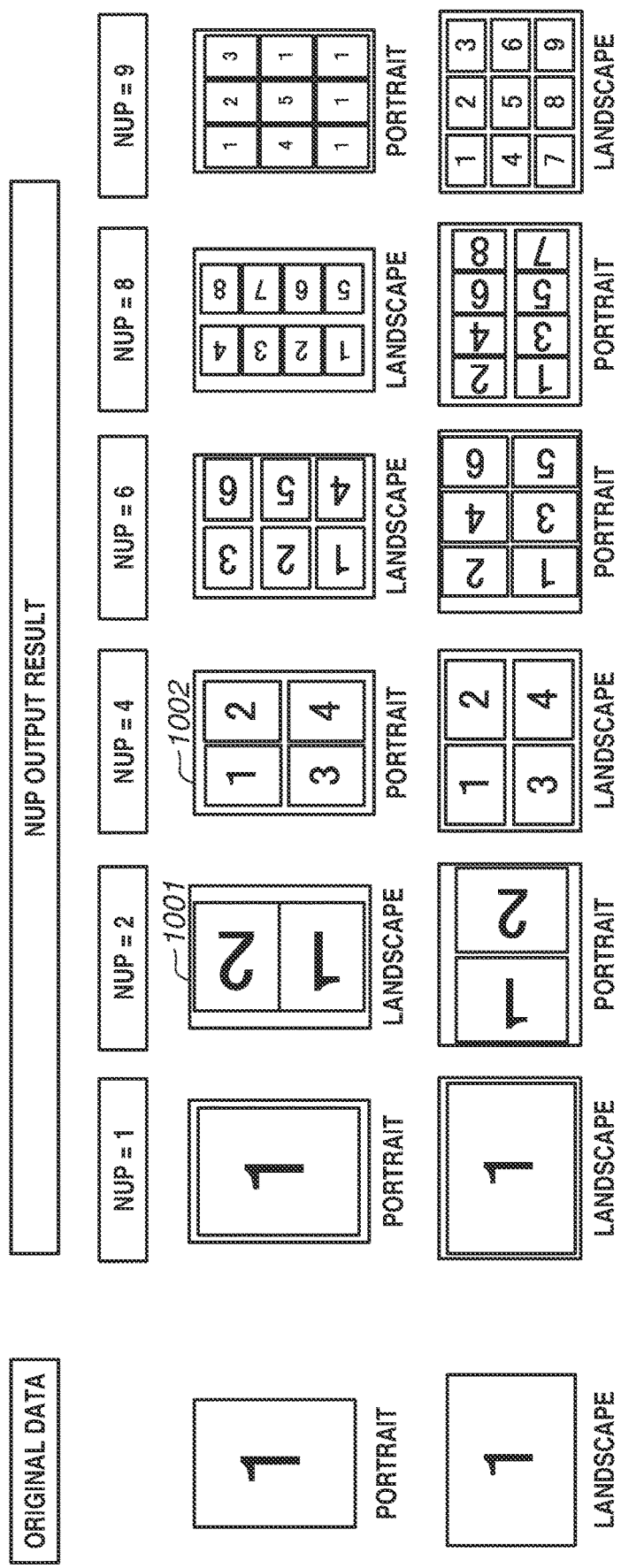
FIG. 11 is a diagram illustrating examples of a layout in a case where the N-in-one printing is set according to the example embodiment.

The transmitted ability information includes the type supported by the N-in-one printing and the type of the finishing processing by the post-processing apparatus 300 (e.g., the presence or absence of punching and stapling) as illustrated in FIG. 7. More specifically, the ability information 701 describes information indicating whether the image forming apparatus 200 supports color printing, the number of sheet cassettes, and the size of a sheet to be fed from each cassette. The ability information 701 also describes information indicating whether the image forming apparatus 200 supports N-in-one printing (also referred to as Number-up (Nup) printing) and indicating the number of pages of images (also referred to as Nup) that can be aggregated in one sheet in the N-in-one printing, as indicated by information 702. For example, the information 702 indicates that the image forming apparatus 200 supports N-in-one printing, and indicates that the maximum number of pages that can be aggregated in one sheet is nine. Being capable of printing a maximum of nine pages in one sheet means that, as illustrated in FIG. 11, the number N of pages to be aggregated in one sheet is 1, 2, 4, 6, 8, or 9, and images corresponding to N pages can be laid out and printed on one side of a sheet.

The ability information 701 also describes whether the image forming apparatus 200 can execute post-processing, and what type of post-processing the image forming apparatus 200 can execute. Information 703 indicates whether the image forming apparatus 200 can execute post-processing. In the example of FIG. 7, the information 703 states that the image forming apparatus 200 can execute post-processing. Information 704 describes the type of post-processing that the image forming apparatus 200 can execute. In the example of FIG. 7, the information 704 states that the image forming apparatus 200 can execute stapling processing and punching processing. Further, information 705 describes the positions where the stapling processing or the punching processing can be executed.

In step S505, upon receiving the ability information, the information processing apparatus 100 stores the ability information in the memory 111 and generates a print queue. To generate the print queue, the information processing apparatus 100 stores the information regarding the image forming apparatus 200 in association with the predetermined software provided by the OS of the information processing apparatus 100 and generates the print queue. Use of the print queue generated in this step enables the information processing apparatus 100 to transmit the print job generated by the predetermined software compliant with the IPP to the image forming apparatus 200.

Figure 6:
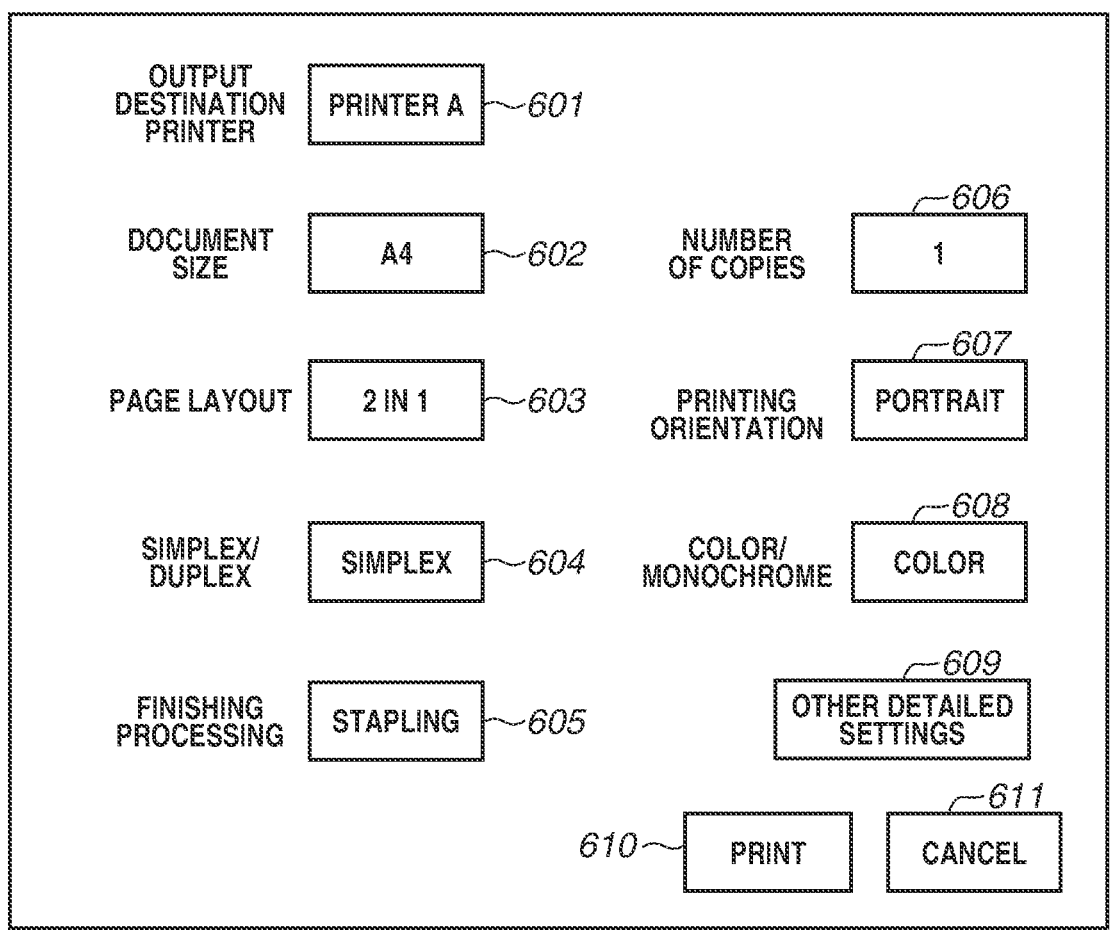
FIG. 6 is a diagram illustrating an example of a screen displayed to make print settings according to the example embodiment.

On the information processing apparatus 100, the user provides an instruction to print a desired document or image. At this time, an application started to display the document or image, or the OS of the information processing apparatus 100 displays a print settings screen. The information processing apparatus 100 accesses an image forming apparatus set as a default printer for printing, and reacquires ability information. Based on the reacquired information, the information processing apparatus 100 displays the print settings screen. FIG. 6 illustrates an example of the print settings screen displayed at this time. The user selects a printer for use in printing by operating an object 601 included in the print settings screen. In the present example embodiment, the image forming apparatus 200 is assumed to be selected.

In step S506, the information processing apparatus 100 accesses the image forming apparatus 200 to acquire the ability information. The acquisition of the ability information in step S506 is basically similar to the acquisition of the ability information in step S503. The information processing apparatus 100 acquires the ability information when the printer is selected, thereby enabling the display of the print settings screen using the latest ability information.

In step S507, the image forming apparatus 200 transmits a response to a request to acquire the ability information. In step S508, based on the received latest ability information, the information processing apparatus 100 updates the print settings screen illustrated in FIG. 6.

On the print settings screen in FIG. 6, an object 602 for selecting the document size, an object 606 for specifying the number of copies to be printed, and an object 607 for setting the printing orientation are arranged. On the print settings screen, an object 604 for specifying the print side and an object 608 for specifying color printing are also arranged.

Further, on the print settings screen, an object 603 for selecting the page layout on one sheet, an object 605 for selecting the finishing processing, and an object (not illustrated) for selecting the finishing position are displayed.

By operating the object 603, the user can select the number of pages to be aggregated on one side of a sheet. Options that can be selected when the user operates the object 603 are determined based on the description in the ability information 701.

By operating the object 605, the user can select the type of finishing processing to be executed. When the user operates the object 605 to select the type of finishing processing, the default setting of the finishing position based on the selected type is selected in the object for selecting the finishing position. If the user operates this object, a list of positions where the finishing processing of the type selected using the object 605 can be executed is displayed. The list is displayed based on the information 705 in the ability information 701. If the user selects the finishing position, the selected position is displayed in the object for selecting the finishing position.

An object 609 is used to additionally set items that are unable to be set on the print settings screen illustrated in FIG. 6. If the user selects the object 609, a predetermined application or the OS of the information processing apparatus 100 displays an additional print settings screen. By operating the additional print settings screen, the user can make additional print settings. Alternatively, the user may set the N-in-one printing or the finishing processing on the additional print settings screen.

An object 610 is used by the user to provide an instruction to start printing. An object 611 is used to close the print settings screen. When the object 610 is selected, the CPU 110 of the information processing apparatus 100 operates, calls the predetermined software provided by the OS of the information processing apparatus 100, and causes the predetermined software to generate print data. Then, the information processing apparatus 100 transmits the print data generated by the predetermined software to the image forming apparatus 200.

Step S509 and subsequent steps in FIG. 5 will be described assuming two cases (case 1 and case 2).

Steps S509 to S512 correspond to the case 1 where landscape-oriented images are printed by providing instructions to perform the two-in-one printing and execute the stapling processing as illustrated in the example (b2) of FIG. 4. Steps S513 to S516 correspond to the case 2 where portrait-oriented images are printed by providing instructions to perform the two-in-one printing and execute the stapling processing as illustrated in the example (b1) of FIG. 4.

Suppose that, on the print settings screen displayed on the information processing apparatus 100, the document size is set to "A4", "2 in 1" is selected as the page layout, "stapling" is selected as the finishing processing, and the object 610 is selected. In this case, the information processing apparatus 100 calls predetermined software associated with a print queue corresponding to the printer name set using the object 601 and causes the predetermined software to generate print data. The print data includes image data for use in the printing processing, and print ticket information that describes print settings. In this case, the print data is assumed to be generated using the predetermined software provided by the OS of the information processing apparatus 100.

In step S509, the predetermined software provided by the OS generates the print ticket information that describes print settings, according to the specifications of the IPP. Portable Document Format (PDF) information 710 in FIG. 7 is an example of PDF information added to the image data generated in step S509. The PDF information 710 describes the image size, the width and the height of each image, information indicating which of color printing and monochrome printing is to be used, and the number of pages. The PDF information 710 is data written in the PDF file which is the image data generated by the predetermined software provided by the OS.

The predetermined software provided by the OS of the information processing apparatus 100 also generates the print ticket information such as print ticket information 720 illustrated in FIG. 7. The print ticket information 720 describes the sheet size, the printing orientation indicating in which orientation the printing is to be performed on a portrait-oriented sheet, information indicating color printing or monochrome printing, the number of pages, and information indicating duplex printing or simplex printing. The print ticket information 720 also describes Nup 721 in the N-in-one printing and a stapling position 722. The PDF information 710 and the print ticket information 720 illustrated in FIG. 7 are the PDF information and print ticket information generated by the information processing apparatus 100 when the printing is performed with the settings corresponding to the case 1 in FIG. 5. In other words, the PDF information 710 and the print ticket information 720 are the PDF information and print ticket information generated in a case where the user sets the two-in-one printing and the top-left stapling for landscape-oriented images.

If images are landscape-oriented, the predetermined software provided by the OS of the information processing apparatus 100 describes the post-processing position in the print ticket information 720 by rotating the post-processing position by 90 degrees to the left. Thus, even if the user specifies "top left" on the print settings screen, the print ticket information 720 describes "bottom_left". In step S510, the information processing apparatus 100 transmits the image data including the PDF information 710 and the print ticket information 720 to the image forming apparatus 200.

In step S511, the image forming apparatus 200 analyzes the PDF information 710 in the received image data and the print ticket information 720. The image forming apparatus 200 changes the finishing position and executes the printing processing based on the information regarding the width and the height of each image that are written in the PDF information 710 and the Nup 721 in the N-in-one printing and the stapling position 722 that are written in the print ticket information 720. At this time, the image forming apparatus 200 changes the stapling position 722 written in the print ticket information 720 from "bottom_left" to "top left" and executes the printing processing and the post-processing, thereby making it possible to obtain an output like the example (b2) of FIG. 4.

After the output processing, then in step S512, the image forming apparatus 200 transmits to the information processing apparatus 100 a notification that the printing is completed. The above is the description of the processing in the case 1.

Next, as the case 2, a case will be described where original images to be printed are portrait-oriented, the Nup 721 in the N-in-one printing is 2, and the stapling position 722 is set to "top left".

In a case where the printing is performed by setting the document size to "A4", selecting "2 in 1" as the page layout, and selecting "stapling" as the finishing processing, then in step S513, the information processing apparatus 100 generates the print ticket information 720 according to the IPP. The PDF information 710 and the print ticket information 720 to be generated in step S513 will now be described with reference to the PDF information 710 and the print ticket information 720 in FIG. 7. Firstly, since the image data is portrait-oriented images, the width and the height in the PDF information 710 are different from each other. For example, "PDFinfo_Width" is "210", and "PDFinfo_Height" is "297". In the case of portrait-oriented images, the height is greater than the width. Secondly, since the original images are portrait-oriented, the stapling position is not rotated. Thus, the stapling position 722 ("PT_StapleLocation") in the print ticket information 720 is "top_left".

In step S513, the information processing apparatus 100 generates the image data including the PDF information 710, and the print ticket information 720. In step S514, the information processing apparatus 100 transmits the image data and the print ticket information 720 to the image forming apparatus 200. In step S515, based on the PDF information 710 and the print ticket information 720, the image forming apparatus 200 determines whether to change the finishing position. Using the received PDF information 710 and the received print ticket information 720 results in an output like the example (a1) of FIG. 4. Thus, the image forming apparatus 200 changes the finishing position to "bottom_left" and executes the output processing.

After the printing processing is completed, then in step S516, the image forming apparatus 200 transmits to the information processing apparatus 100 a notification that the processing is completed.

As described above, the image forming apparatus changes the finishing position based on information regarding the image size included in the image data and the number of pages to be aggregated in N-in-one printing, thereby preventing the finishing processing from being executed at the position unintended by the user.

The finishing position change processing executed by the image forming apparatus 200 in step S511 or S515 in FIG. 5 will be described in detail with reference to FIG. 8.

Figure 8:
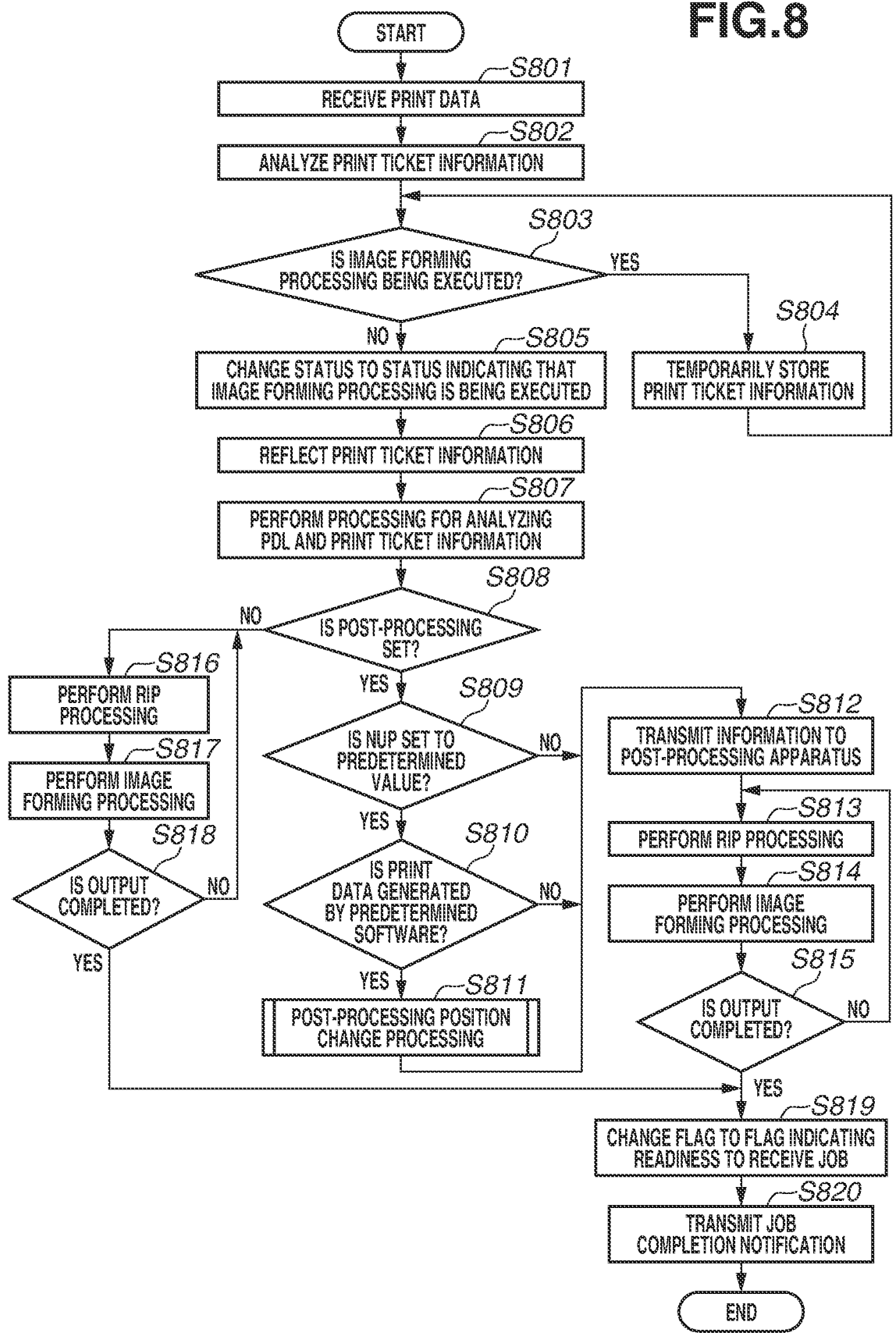
FIG. 8 is a flowchart illustrating processing executed by the image forming apparatus according to the example embodiment.

FIG. 8 is a flowchart illustrating the stapling position change processing executed by the image forming apparatus 200 according to the present example embodiment. A program for executing processing steps illustrated in FIG. 8 is stored in the ROM 222 or the storage device 223 of the image forming apparatus 200. The processing is implemented by the CPU 220 of the image forming apparatus 200 calling and executing the program.

In step S801, the CPU 220 receives print data from the information processing apparatus 100. The print data includes the image data including the PDF information 710, and the print ticket information 720.

In step S802, the CPU 220 analyzes the received print ticket information 720. The CPU 220 acquires the print size in the print ticket information 720 illustrated in FIG. 7. The CPU 220 analyzes the print ticket information 720 and determines whether the image forming apparatus 200 can execute processing based on the setting values described in the print ticket information 720. If the image forming apparatus 200 is unable to execute the processing based on the setting values described in the print ticket information 720, the CPU 220 transmits an error notification and displays on the operation unit 229 a message indicating that the printing based on the received print data is not possible. Alternatively, if the image forming apparatus 200 is unable to execute the processing based on the setting values described in the print ticket information 720, the CPU 220 may change the setting values described in the print ticket information 720 to values based on which the image forming apparatus 200 can execute processing.

In step S803, the CPU 220 determines whether the image forming apparatus 200 is executing image forming processing. The CPU 220 executes the determination processing in step S803 by referring to a flag indicating whether the image forming apparatus 200 is executing the image forming processing.

If the CPU 220 determines that the image forming processing is being executed (YES in step S803), then in step S804, the CPU 220 stores the print data received in step S801 in a temporary storage area. After the image forming apparatus 200 completes the image forming processing being executed, the print data stored in the temporary storage area is read, and the image forming processing based on the read print data is started.

If the CPU 220 determines that the image forming processing is not being executed (NO in step S803), then in step S805, the CPU 220 changes the status of the image forming apparatus 200 to a status indicating that the image forming processing is being executed. In step S805, the CPU 220 changes the flag indicating that the image forming processing is not being executed to a flag indicating that the image forming processing is being executed.

In step S806, the CPU 220 analyzes the print ticket information 720 and stores, in the RAM 221, the setting values described in the print ticket information 720 as the setting values that can be referred to in the processing steps.

In step S807, the CPU 220 executes processing for analyzing the PDL and processing for analyzing the print ticket information 720. First, the CPU 220 refers to PDF information of the PDF file which is the image data. The CPU 220 reads information indicating the width and the height of each image that are written in the PDF information. The CPU 220 compares the read width and height with each other, and if the height is greater than the width, the CPU 220 determines that the transmitted image data is portrait-oriented images. If the height is less than the width, the CPU 220 determines that the transmitted image data is landscape-oriented images. The CPU 220 stores information indicating the portrait orientation or the landscape orientation as the determination result in the RAM 221. Further, the CPU 220 refers to the print ticket information 720 and determines whether the N-in-one printing is set. If the setting value of the N-in-one printing is 1, the layout remains unchanged and thus additional processing is not to be executed. If the setting value of the N-in-one printing is 2 or more, the image forming apparatus 200 is to change the layout of the images. FIG. 11 illustrates examples of the number of pages to be aggregated (Nup) and the layout in a case where the N-in-one printing is set. For example, if the image data transmitted from the information processing apparatus 100 is portrait-oriented, and the number of pages to be aggregated in the N-in-one printing is 2, the CPU 220 executes processing for rotating the images, thereby generating landscape-oriented image data. Then, the CPU 220 executes processing for laying out the generated landscape-oriented images, thereby generating image data as illustrated in a layout 1001. If the number of pages to be aggregated is 4, the processing for rotating the images is not to be executed as illustrated in a layout 1002, but processing for laying out images corresponding to four pages on one side of a sheet is to be executed. In step S807, the CPU 220 refers to the width and the height of a sheet that are written in the PDF information 710 and the Nup 721 written in the print ticket information 720, and executes the layout processing.

In step S808, the CPU 220 refers to the print ticket information 720 stored in the RAM 221 and determines whether the post-processing is set. If the CPU 220 determines that the post-processing is not set (NO in step S808), then in step S816, the CPU 220 executes RIP processing. The received image data is converted into raster images by this RIP processing. In step S817, the CPU 220 controls the printer 251 to form the generated raster images on recording media such as sheets. In step S818, the CPU 220 determines whether the output of the images of all the pages is completed. If the output of the images of all the pages is completed (YES in step S818), the processing proceeds to step S819. If the output of the images of all the pages is not completed (NO in step S818), the processing returns to step S816.

If the CPU 220 determines that the post-processing is set (YES in step S808), then in step S809, the CPU 220 determines whether the number of pages to be aggregated (Nup) is set to a predetermined value. The predetermined value refers to the number of pages to be aggregated that causes the images to be rotated and laid out when a plurality of pages is printed on one side of a recording medium. For example, if pages are printed on one side in any of the layouts illustrated in FIG. 11, the predetermined value is 2, 6, or 8. The predetermined value described above is merely an example, and in step S809, the CPU 220 determines whether the number of pages to be aggregated (Nup) is set to a value specified in advance.

If the number of pages to be aggregated (Nup) is not set to a predetermined value (NO in step S809), the processing proceeds to step S812. Examples of the case where the number of pages to be aggregated (Nup) is not set to a predetermined value include a case where the number of pages to be aggregated (Nup) is set to a value that enables the received images to be laid out without being rotated, such as Nup=1, 4, or 9 in FIG. 11.

If the number of pages to be aggregated (Nup) is set to a predetermined value (YES in step S809), then in step S810, the CPU 220 determines whether the received print data is generated by the predetermined software. The details of processing executed by the CPU 220 in step S810 will now be described. First, the CPU 220 determines a protocol used to receive the print data. If the protocol used to receive the print data is not a predetermined protocol, the CPU 220 determines that the received print data is not generated by the predetermined software. The predetermined protocol in step S810 is the IPP, for example. Next, the CPU 220 determines whether a user agent acquired from the information processing apparatus 100 having transmitted the print data is a predetermined user agent. The "user agent" refers to information regarding software used to transmit the print data. If the predetermined user agent is specified, the CPU 220 determines that the received print data is generated by the predetermined software. If the user agent is not the predetermined user agent, the CPU 220 determines whether the value of a document format attribute received from the information processing apparatus 100 is a predetermined value. This is processing for determining whether the received print data is generated by a printer driver manufactured by the vendor of the image forming apparatus 200. If the value of the document format attribute is not the predetermined value, the CPU 220 determines that the received print data is generated by the predetermined software. As described above, in the present example embodiment, the CPU 220 determines whether the received print data is generated by the predetermined software, based on the protocol used to receive the print data, the user agent information, and the document format attribute. Alternatively, the CPU 220 may determine whether the received print data is generated by the predetermined software, based on the protocol used to receive the print data and the format of the image data. For example, if the protocol used to receive the print data is the IPP, and the file format of the image data is PDF or Printer Working Group (PWG) Raster, the CPU 220 may determine that the received print data is generated by the predetermined software.

If the CPU 220 determines that the received print data is not generated by the predetermined software (NO in step S810), the processing proceeds to step S812. If the CPU 220 determines that the received print data is generated by the predetermined software (YES in step S810), the CPU 220 executes the post-processing position change processing in step S811. In the present example embodiment, after determining whether the number of pages to be aggregated (Nup) is set to a predetermined value in step S809, the CPU 220 determines whether the print data is generated by the predetermined software in step S810. Alternatively, the determination in step S810 may be made first, and if the print data is determined to have been generated by the predetermined software, the processing in step S809 may be executed.

In step S811, the CPU 220 executes processing for changing the finishing position in the print ticket information 720. The details of the processing executed by the CPU 220 in step S811 will be described below with reference to FIG. 9.

In step S812, the CPU 220 notifies the post-processing apparatus 300 about the type of the post-processing described in the print ticket information 720 and the post-processing position after the change in step S811.

In step S813, the CPU 220 executes the RIP processing on the image data after the layout is changed in step S807. While the CPU 220 executes the RIP processing in the present example embodiment, the GPU 227 may execute the RIP processing.

In step S814, the CPU 220 controls the printer 251 to form the images on recording media such as sheets. The sheets on which the images are formed are discharged to the post-processing apparatus 300. In step S815, the CPU 220 determines whether the output of the images of all the pages is completed. If the output of the images of all the pages is not completed (NO in step S815), the processing returns to step S813.

The sheets on which the images are formed in step S814 are discharged to the post-processing apparatus 300. The post-processing apparatus 300 executes processing on the sheets discharged from the image forming apparatus 200, at appropriate timing based on the type of the post-processing and the post-processing position provided in step S812.

If the output is completed (YES in step S815), then in step S819, the CPU 220 sets the flag indicating that the image forming apparatus 200 is executing the image forming processing to off. Then, in step S820, the CPU 220 transmits to the information processing apparatus 100 a notification that the image forming processing based on the received print data is completed.

Figure 9:
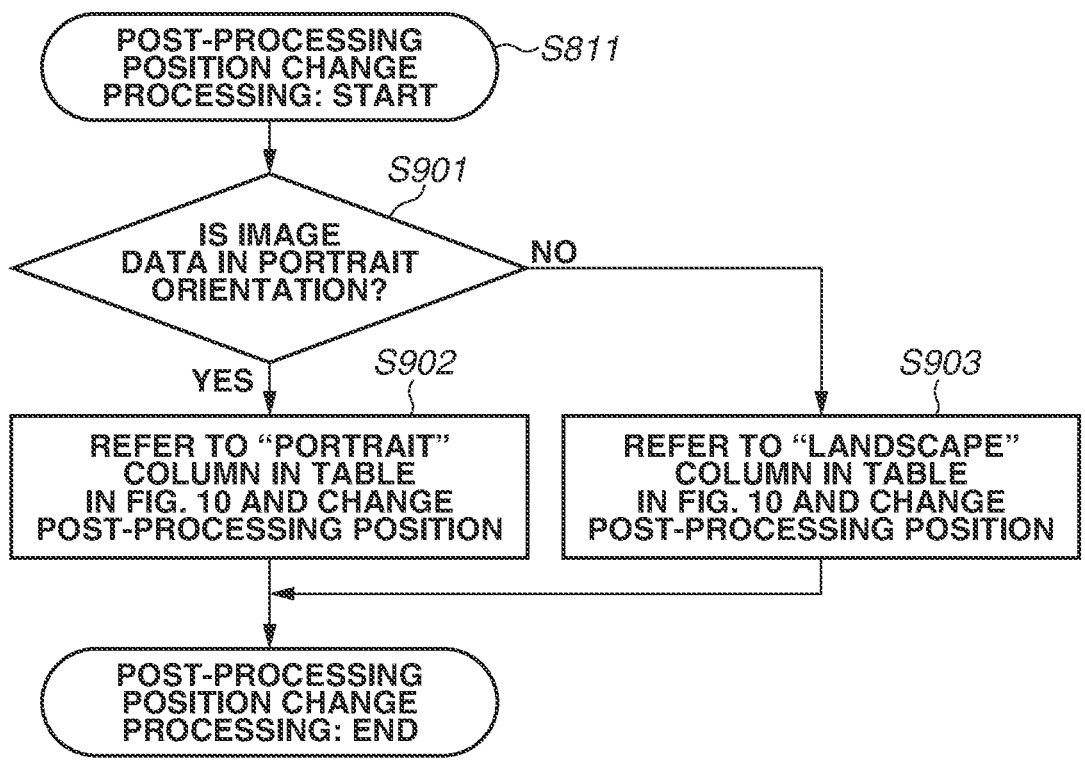
FIG. 9 is a flowchart illustrating post-processing position change processing executed by the image forming apparatus according to the example embodiment.

FIG. 9 is a flowchart illustrating the details of the post-processing position change processing in step S811 in FIG. 8. A program for executing processing in each block in FIG. 9 is stored in the ROM 222 or the storage device 223. The processing illustrated in FIG. 9 is implemented by the CPU 220 reading and executing the program.

In step S901, the CPU 220 determines whether the image data included in the received print data is portrait-oriented. Based on the information determined by the CPU 220 in step S807, the CPU 220 determines whether the image data included in the print data is portrait-oriented.

If the image data is portrait-oriented (YES in step S901), then in step S902, the CPU 220 refers to a "portrait" column in FIG. 10 and changes the post-processing position. FIG. 10 illustrates a table that stores the correspondence between the post-processing position set in the print ticket information 720 received in the post-processing position change processing, and the post-processing position after the post-processing position change processing. For example, if the finishing position set before the change is "top left" and the image data is portrait-oriented, the finishing position is changed to "bottom left". As illustrated in FIG. 10, if the received image data is portrait-oriented, the post-processing position is changed to a position obtained by rotating the post-processing position by 90 degrees to the left.

If the CPU 220 determines that the received image data is not portrait-oriented (NO in step S901), the processing proceeds to step S903. In step S903, the CPU 220 refers to a "landscape" column in the table of FIG. 10 and changes the post-processing position included in the print ticket information 720. For example, if "top left" is specified as the post-processing position in the print ticket information 720, the CPU 220 changes the post-processing position to "top right". As described above, if the image data included in the received print data is landscape-oriented, the post-processing position is changed to a position obtained by rotating the post-processing position by 90 degrees to the right.

If the change of the post-processing position ends, the processing illustrated in FIG. 9 is completed, and the processing proceeds to step S812 in FIG. 8.

The post-processing position change processing illustrated in FIG. 9 makes it possible to prevent the post-processing from being executed at a position different from a position intended by the user when the N-in-one printing is enabled.

As described in the present example embodiment, determinations are made about the orientation of data before the N-in-one printing and the number of pages to be aggregated, and processing for correcting the finishing position is executed, whereby, even in a case where the N-in-one printing and the post-processing are specified in combination, it is possible to execute the post-processing as intended by the user.

In the present example embodiment, image data in PDF format has been described as an example of image data, but the format of image data may be another format such as raster data.

The post-processing has been described using stapling and punching as examples of the type of the post-processing. Similar processing may be executed for another type of post-processing such as folding.

In the present example embodiment, the image forming apparatus 200 and the post-processing apparatus 300 have been described as different apparatuses. Alternatively, the image forming apparatus 200 may have the function of the post-processing apparatus 300 and execute processing including post-processing.

An example embodiment of the present disclosure can also be implemented by the following processing. Software (a program) for implementing the functions according to the above-described example embodiment is supplied to a system or an apparatus via a network or various storage media, and a computer (or a CPU or a microprocessor unit (MPU)) of the system or the apparatus reads and executes the program code. In this case, the computer program and a storage medium storing the computer program are included in example embodiments of the present disclosure.

According to the above-described example embodiment, when N-in-one printing and post-processing are both set, it is possible to reduce the possibility that the post-processing can be executed at a position different from a position intended by the user.

OTHER EMBODIMENTS

Various embodiment(s) of the present disclosure can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While example embodiments have been described, it is to be understood that the disclosure is not limited to the disclosed example embodiments. The scope of the following claims is to be accorded the broadest interpretation so as to encompass all such modifications and equivalent structures and functions.

This application claims the benefit of Japanese Patent Application No. 2022-035914, filed Mar. 9, 2022, which is hereby incorporated by reference herein in its entirety.

What is claimed is:

1. An image forming apparatus comprising:
a printer that prints an image corresponding to image data received from an information processing apparatus; and
a controller that performs processing (i) in a case where a number of pages to be printed by the printer in N-in-one printing on one side of one sheet is a predetermined number, to change a post-processing position indicated by information received from the information processing apparatus, based on whether an orientation of the image corresponding to the image data received from the information processing apparatus is a portrait orientation or a landscape orientation, and in a case where the number of pages is not the predetermined number, to not change the received post-processing position, and (ii) that causes the printer to print the image corresponding to the received image data according to a result of the processing performed by the controller.

2. The image forming apparatus according to claim 1, wherein the image forming apparatus is connected to a finisher that executes a post-processing based on the changed post-processing position.

3. The image forming apparatus according to claim 1, wherein the post-processing position is a stapling position.

4. The image forming apparatus according to claim 1, wherein the predetermined number includes 2.

5. The image forming apparatus according to claim 1, wherein the controller further changes, in a case where the number of pages to be printed by the printer in the N-in-one printing on one side of one sheet is the predetermined number and the orientation is the portrait orientation, the post-processing position to a position obtained by rotating the received post-processing position by 90 degrees to the left.

6. The image forming apparatus according to claim 5, wherein the controller further changes, in a case where the number of pages to be printed by the printer in the N-in-one printing on one side of one sheet is the predetermined number and the orientation is the landscape orientation, the received post-processing position to a position obtained by rotating the received post-processing position by 90 degrees to the right.

7. The image forming apparatus according to claim 1, wherein the predetermined number includes 2 and 6.

8. The image forming apparatus according to claim 1, wherein the N-in-one printing is a function of printing the received image data by aggregating N pages of the received image data on one side of the one sheet.

9. The image forming apparatus according to claim 1, wherein information regarding the number of pages to be printed by the printer in the N-in-one printing on one side of one sheet, and the information indicating the post-processing position are received according to a predetermined protocol.

10. The image forming apparatus according to claim 9, wherein the predetermined protocol is Internet Printing Protocol (IPP).

11. The image forming apparatus according to claim 1, wherein the image data is in a predetermined file format.

12. The image forming apparatus according to claim 11, wherein the predetermined file format is Portable Document Format (PDF).

13. The image forming apparatus according to claim 1, wherein the predetermined number includes 2, 6 and 8.

14. The image forming apparatus according to claim 1, wherein the post-processing position is a punching position.

15. A method for controlling an image forming apparatus, the method comprising:
a printer that prints an image corresponding to image data received from an information processing apparatus; and
a controller that performs processing (i) in a case where a number of pages to be printed by the printer in N-in-one printing on one side of one sheet is a predetermined number, to change a post-processing position indicated by information received from the information processing apparatus, based on whether an orientation of the image corresponding to the image data received from the information processing apparatus is a portrait orientation or a landscape orientation, and in a case where the number of pages is not the predetermined number, to not change the received post-processing position, and (ii) that causes the printer to print the image corresponding to the received image data according to a result of the processing performed by the controller.

16. A non-transitory computer-readable storage medium storing a program for causing a computer to execute a process for controlling an image forming apparatus, the process comprising:
a printer that prints an image corresponding to image data received from an information processing apparatus; and
a controller that performs processing (i) in a case where a number of pages to be printed by the printer in N-in-one printing on one side of one sheet is a predetermined number, to change a post-processing position indicated by information received from the information processing apparatus, based on whether an orientation of the image corresponding to the image data received from the information processing apparatus is a portrait orientation or a landscape orientation, and in a case where the number of pages is not the predetermined number, to not change the received post-processing position, and (ii) that causes the printer to print the image corresponding to the received image data according to a result of the processing performed by the controller.

* * * * *